United States Patent
Shim et al.

(10) Patent No.: US 10,468,698 B2
(45) Date of Patent: Nov. 5, 2019

(54) METHOD OF ELIMINATING LEAKAGE FROM FUEL TANK VALVE

(71) Applicant: HYUNDAI MOTOR COMPANY, Seoul (KR)

(72) Inventors: Ji Hyun Shim, Seoul (KR); Chang Ho Kim, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 248 days.

(21) Appl. No.: 15/381,509

(22) Filed: Dec. 16, 2016

(65) Prior Publication Data

US 2018/0034085 A1 Feb. 1, 2018

(30) Foreign Application Priority Data

Jul. 29, 2016 (KR) .................. 10-2016-0096698

(51) Int. Cl.
| | |
|---|---|
| *H01M 8/04228* | (2016.01) |
| *H01M 8/04223* | (2016.01) |
| *H01M 8/0438* | (2016.01) |
| *H01M 8/04303* | (2016.01) |
| *H01M 8/04089* | (2016.01) |
| *H01M 8/04082* | (2016.01) |
| *H01M 8/04746* | (2016.01) |
| *H01M 8/04955* | (2016.01) |
| *H01M 8/24* | (2016.01) |
| *H01M 16/00* | (2006.01) |
| *H01M 8/04664* | (2016.01) |
| *B60L 50/72* | (2019.01) |

(52) U.S. Cl.
CPC ......... *H01M 8/04425* (2013.01); *B60L 50/72* (2019.02); *H01M 8/04089* (2013.01); *H01M 8/04201* (2013.01); *H01M 8/04228* (2016.02); *H01M 8/04231* (2013.01); *H01M 8/04303* (2016.02); *H01M 8/04686* (2013.01); *H01M 8/04776* (2013.01); *H01M 8/04955* (2013.01); *H01M 8/24* (2013.01); *H01M 16/006* (2013.01); *H01M 2250/20* (2013.01); *Y02T 90/32* (2013.01)

(58) Field of Classification Search
CPC ......... H01M 8/04425; H01M 8/04228; H01M 8/04303; H01M 8/04223
See application file for complete search history.

(56) References Cited

U.S. PATENT DOCUMENTS

| | | | | |
|---|---|---|---|---|
| 2005/0116190 A1* | 6/2005 | Adams | ............... | F16K 15/026 251/144 |
| 2006/0216555 A1* | 9/2006 | Shige | ............... | H01M 8/04303 429/429 |
| 2007/0224473 A1* | 9/2007 | Suematsu | ......... | H01M 8/04089 429/415 |

(Continued)

FOREIGN PATENT DOCUMENTS

| | | |
|---|---|---|
| JP | 2014-197510 A | 10/2014 |
| KR | 10-2004-0003575 | 11/2004 |

(Continued)

*Primary Examiner* — Jonathan G Jelsma
(74) *Attorney, Agent, or Firm* — Morgan, Lewis & Bockius LLP

(57) ABSTRACT

A method of eliminating leakage from a fuel tank valve includes when the leakage occurs, consuming fuel stored in a passage between a fuel tank and a stack in a state in which a tank valve is closed.

12 Claims, 4 Drawing Sheets

(56) References Cited

U.S. PATENT DOCUMENTS

2012/0015268 A1* 1/2012 Yoshida ............ H01M 8/04223
429/429

FOREIGN PATENT DOCUMENTS

| KR | 10-0748662 B1 | 8/2007 |
| KR | 10-1013959 B1 | 2/2011 |
| KR | 10-2012-0059802 | 3/2013 |
| KR | 10-1393581 | 5/2014 |
| KR | 10-2014-0083739 A | 7/2014 |
| KR | 10-2014-0125620 | 10/2014 |

* cited by examiner

METHOD OF ELIMINATING LEAKAGE FROM FUEL TANK VALVE

CROSS-REFERENCE TO RELATED APPLICATION

This application claims under 35 U.S.C. § 119(a) the benefit of priority to Korean Patent Application No. 10-2016-0096698, filed on Jul. 29, 2016 with the Korean Intellectual Property Office, the entire contents of which are incorporated herein by reference.

TECHNICAL FIELD

The present disclosure relates to a method of eliminating leakage from a fuel tank valve. More particularly, the present disclosure relates to a method which includes steps of detecting whether or not leakage occurs in a fuel tank valve, eliminating the leakage and determining whether or not the leakage is eliminated.

BACKGROUND

A fuel cell vehicle is a vehicle which obtains driving force by a motor using electricity generated when hydrogen reacts with oxygen. The fuel cell vehicle is generally equipped with a hydrogen storage system, and recent trends equip such a vehicle with a commercialized hydrogen storage system having a high-pressure capability of 700 bar. Pipes and fittings, which may endure various pressure levels from high pressure (700 bar) to low pressure (1 bar), are present between a high-pressure hydrogen storage system and a fuel cell stack. The performance for sealing gas, such as hydrogen, is one of the principal factors related to efficiency and safety. In particular, the sealing of a fuel tank valve, which serves to discharge hydrogen stored in a fuel tank, is a very important factor related to the overall safety and efficiency of vehicles.

In a conventional fuel cell system including components such as a fuel tank and a stack, the flow rate in a passage for connecting the components and the size of a purge valve for purging the pressure in the stack are restricted. Accordingly, in order to relieve the pressure of the entire system, a separate pipe is connected to the system after a supply pipe for a vehicle is removed therefrom. However, when leakage occurs in the system, it is difficult to eliminate the leakage without removing the high-pressure/supply pipe.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with prior art.

In one aspect, the present disclosure provides a method of eliminating leakage from a fuel tank valve, which can rapidly consume hydrogen in a fuel cell system attached to a vehicle without separate detachment of the system, i.e. without performing a separate servicing process, and can eliminate leakage from a fuel tank valve by relieving the pressure in a high-pressure line through a purge valve.

In some embodiments, a method of eliminating leakage from a fuel tank valve includes, when the leakage occurs, consuming fuel stored in a passage between a fuel tank and a stack in a state in which a tank valve is closed.

The fuel may be consumed by opening a purge valve.

The fuel may be consumed by opening a purge valve and driving the stack.

The consuming fuel step may be performed for a certain time after ignition of a vehicle equipped with the fuel tank is turned off.

The consuming fuel step may be performed when the cumulative number of times ignition of a vehicle equipped with the fuel tank is executed exceeds a reference number of times, regardless of whether or not the leakage occurs, or when the occurrence of the leakage in the valve is detected.

The method may further include detecting an occurrence of leakage before the step of consuming fuel is performed, the passage between the fuel tank and the stack may include a high-pressure portion having a relatively high pressure therein and a low-pressure portion having a relatively low pressure therein, the high-pressure portion being formed to, near or adjacent to, the tank valve, the low-pressure portion being formed to, near or adjacent to, the stack, and the occurrence of the leakage in the valve may be detected based on a difference between values obtained by multiplying passage volumes and pressure variations in the respective high and low-pressure portions.

The method may further include driving the stack by supplying fuel thereto from the fuel at a reference flow rate.

The method may further include storing energy generated by driving the stack in an energy storage device.

Whether or not the leakage in the valve is eliminated may be determined by comparing variation in pressure in the fuel tank on the passage between the fuel tank and the stack for a certain time interval with a reference pressure variation value that is preset for determination of leakage.

The method may further include determining whether or not leakage is eliminated, and when the leakage in the valve is determined to not be eliminated, a reference flow rate may be reset to a larger value than an existing reference flow rate, and the eliminating leakage may be repeatedly performed based on the reset reference flow rate.

Other aspects and embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline and electric power sources.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
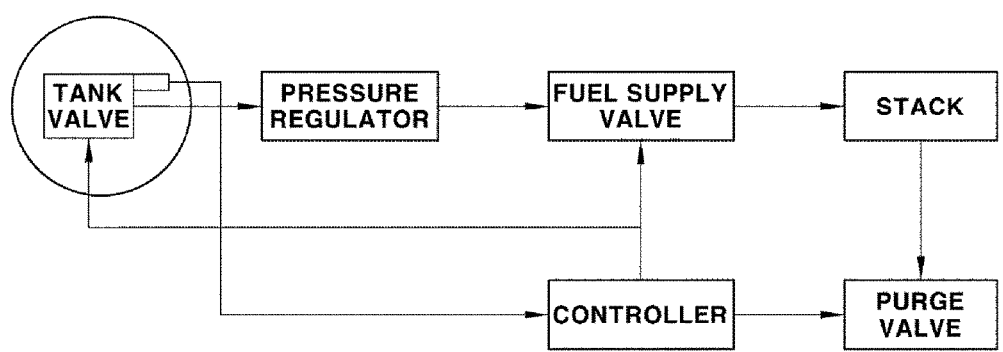
FIG. 1 is a diagram illustrating relationships of components in a fuel cell system according to exemplary embodiments of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the present disclosure as defined by the appended claims.

In addition, terms such as "part", "device" or "module" described herein mean a unit for processing at least one function or operation, which may be realized by hardware, software or a combination thereof.

A four-wheel vehicle may be equipped with a fuel cell system which includes a fuel cell stack, a fuel gas supply/discharge mechanism, an air supply/discharge mechanism, a coolant circulation mechanism and a controller.

Referring to FIG. 1, in exemplary embodiments of the present disclosure, the fuel cell system includes a fuel tank, a pressure regulator which regulates the pressure between the fuel tank and the fuel cell stack, and a fuel supply valve. The fuel supply valve may be repeatedly opened and closed and may serve to supply fuel from the fuel tank to the stack. The fuel supply valve may preferably be a solenoid valve and may serve to supply hydrogen as fuel.

In addition, the fuel cell system may include sensors for respectively detecting whether the valve is opened or closed and for measuring a pressure and a temperature, as well as the controller for controlling the sensors. A purge valve may be installed on a passage through which gas is discharged from the stack. The purge valve may be opened to discharge impurities when the impurities increase in the circulation passage in the stack.

The leakage in the present disclosure means leakage occurring in the tank valve, e.g. a solenoid valve. The leakage mostly occurs due to the gap between a plunger and a poppet of the valve when surface contact therebetween is not adequately formed.

Figure 2:
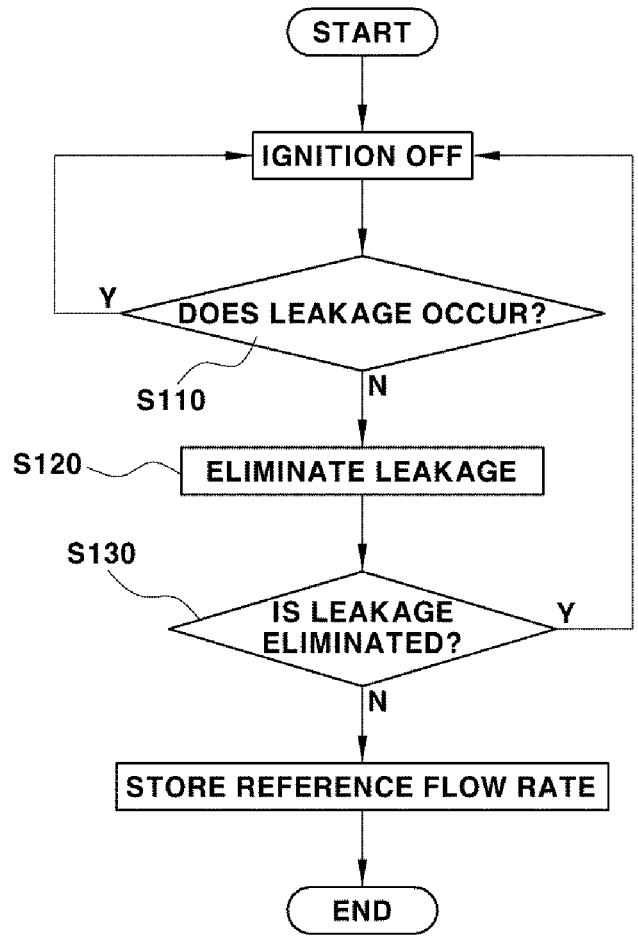
FIG. 2 is a flowchart schematically illustrating a method of eliminating leakage from a fuel tank valve according to exemplary embodiments of the present disclosure.

FIG. 2 is a flowchart schematically illustrating a method of eliminating leakage from a fuel tank valve according to exemplary embodiments of the present disclosure. The method of eliminating leakage from a fuel tank valve according to exemplary embodiments of the present disclosure includes a step of detecting a leakage from a fuel tank valve (S110), a step of eliminating the leakage from the valve (S120) and a step of checking whether or not the leakage is eliminated from the valve (S130). In an embodiment, the method may be performed in the state in which ignition is turned off.

Figure 3:
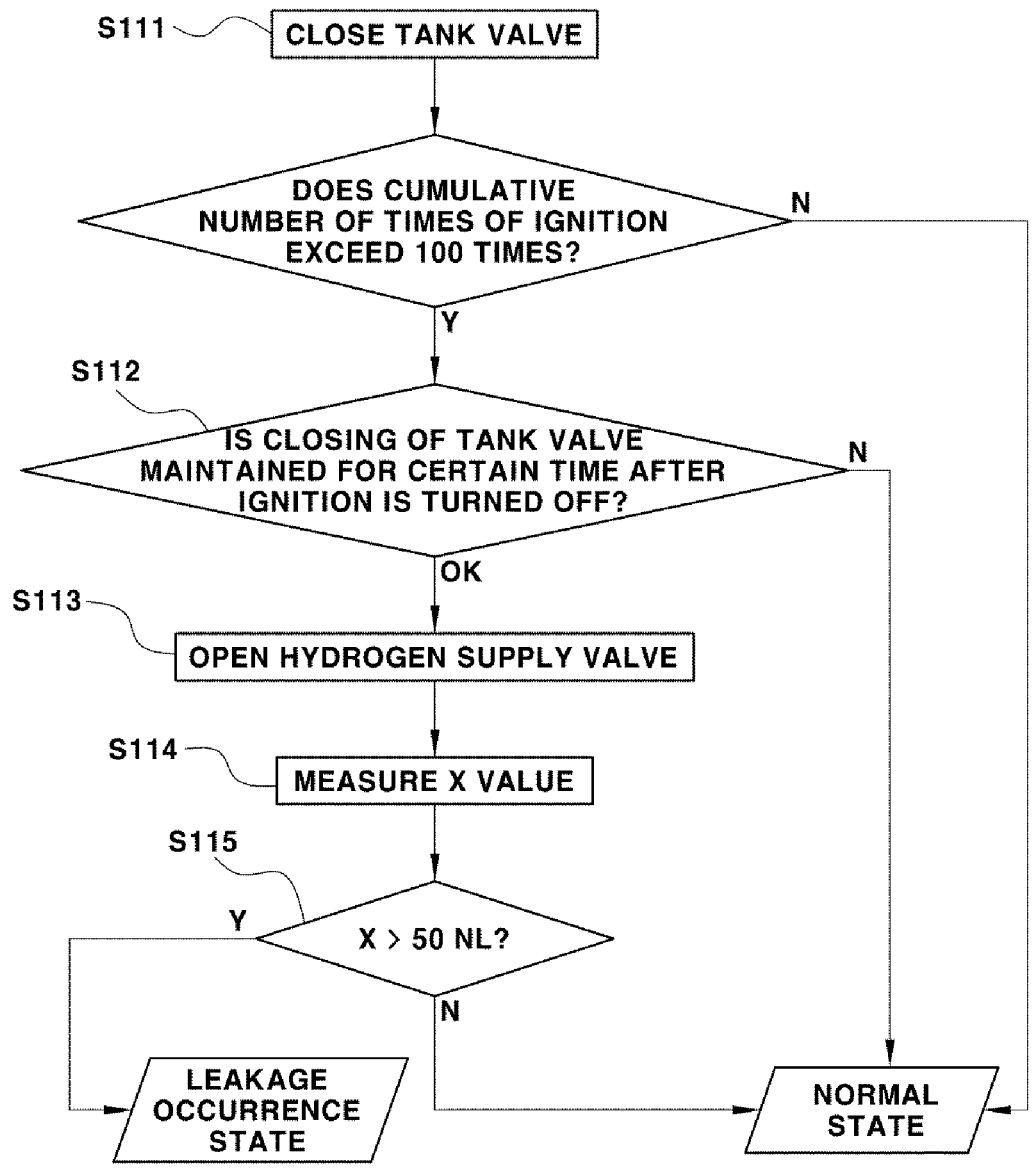
FIG. 3 is a flowchart schematically illustrating a process of detecting leakage from the fuel tank valve according to exemplary embodiments of the present disclosure.

Hereinafter, the step of detecting a leakage from a fuel tank valve (S110) will be described with reference to FIG. 3. In order to detect leakage, the tank valve may be first closed to balance the pressure in the passage between the fuel tank and the stack (S111). If the tank valve is already closed by the turning off of the ignition, the closing of the tank valve may be maintained. After the tank valve is closed, the closing of the tank valve may be maintained until the stack returns to a normal state, namely, until the pressure in the stack drops by X-over, or crossover, through an electrode membrane from the stack. For example, the closing of the tank valve is preferably maintained for eight hours after the ignition is turned off (S112). The fuel supply valve may be opened after a certain time in order to balance the pressure in the passage (S113). The fuel supply valve is a valve that blocks the supply of fuel to the passage formed from the rear end of the pressure regulator to the stack or regulates the flow rate of fuel. In the passage between the fuel tank, the pressure regulator, and the stack, a high-pressure portion having a relatively high pressure therein may be formed near, or adjacent to, the fuel tank, and a low-pressure portion having a relatively low pressure therein may be formed near, or adjacent to, the stack.

Meanwhile, the passage between the fuel tank valve and the pressure regulator is referred to as a high-pressure line, and the passage between the fuel supply valve provided at the rear end of the regulator and the stack is referred to as a low-pressure line. That is, the high-pressure portion may be formed near, or adjacent to, the fuel tank on the high-pressure line, and the low-pressure portion may be formed near, or adjacent to, the stack on the low-pressure line.

After the fuel supply valve is opened, the hydrogen pressure in the high-pressure portion and the pressure in the stack may be monitored by the controller. Whether or not leakage occurs in the tank valve may be detected through variations in volume and pressure in the high-pressure and low-pressure passages. Since the pressure of a fuel electrode drops due to X-over, or crossover, in the stack after a certain time, preferably about eight hours, the occurrence of leakage may be determined based on whether or not the pressure of the fuel electrode drops. Preferably, after variations in the pressure in the low and high-pressure portions in the normal state are measured, the difference between values obtained by multiplying the volumes of the pipes, i.e. the volumes of the passages in the low and high-pressure portions (hereinafter, referred to as an "X" value), may be derived (S114). When the derived X value exceeds a predetermined value, namely when the pressure of the fuel electrode is not dropped despite X-over in the normal state, it may be determined that leakage occurs in the tank valve (S115).

That is, since the quantity of fuel corresponds to a value obtained by multiplying a passage volume and a pressure variation, the difference between values obtained by multiplying volumes and pressure variations in the high and low-pressure portions may be the quantity of leaked fuel. Accordingly, whether or not leakage occurs may be detected based on the difference. In the embodiment of the present disclosure, the X value may be 50 NL, or Normal Liters. A Normal Liter indicates a unit of mass for gases equal to the mass of 1 liter (0.0353147 ft$^3$) at a pressure of 1 atmosphere and at a standard temperature, generally 0° C. (32° F.) or 20° C. (68° F.).

When the determination of whether or not leakage occurs is completed, the purge valve may be opened for a certain time in the state in which the tank valve and the fuel supply valve are closed or the closed state thereof is maintained. The pressure in the passage from the rear end of the fuel supply valve to the purge valve in the stack may be reduced by opening the purge valve. The pressure in the passage may be released by opening the purge vale for three seconds. After the pressure is completely relieved via the purge valve, the process of determining whether or not leakage occurs may be repeatedly performed by closing the purge valve and opening the fuel supply valve.

In addition, the process of determining whether or not leakage occurs may be repeatedly performed whenever the cumulative number of times ignition has been executed exceeds a reference number of times. In exemplary embodiments, the process of determining whether or not leakage occurs may be repeatedly performed whenever the cumulative number of times ignition has been executed exceeds 100 times. If the X value exceeds a predetermined value and leakage is determined to occur, the method of eliminating leakage is performed.

Figure 4:
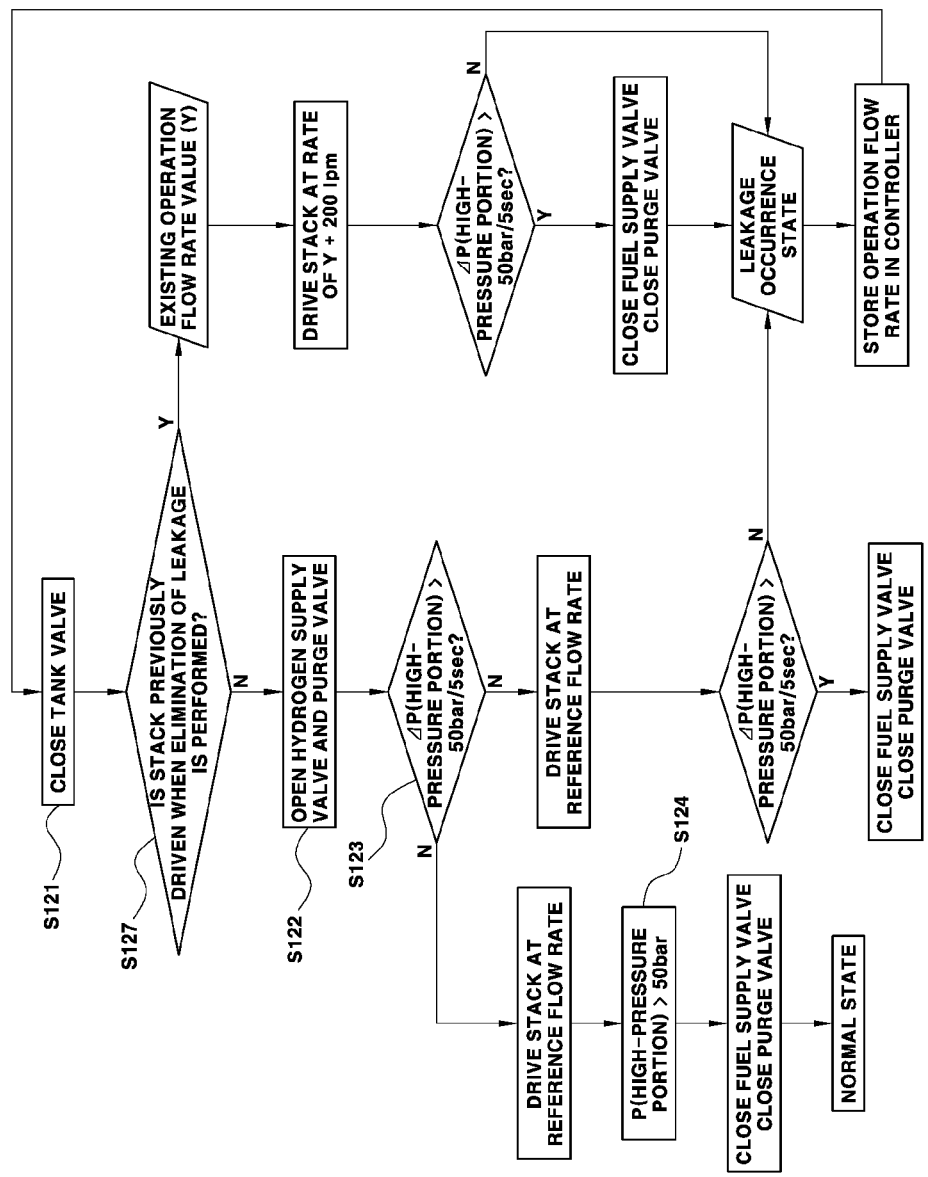
FIG. 4 is a flowchart schematically illustrating a process of eliminating leakage from a fuel tank valve according to exemplary embodiments of the present disclosure.

Hereinafter, the step of eliminating leakage (S120) will be described with reference to FIG. 4. In the state in which the fuel tank valve is closed, hydrogen may be discharged to the outside by opening the purge valve in the passage between the fuel tank and the stack. In addition, hydrogen may be consumed by driving the stack. Moreover, a larger amount of hydrogen in the passage may be consumed when the stack is driven in the state in which the purge valve is opened, compared to the state in which only the purge valve or the stack is operated. The amount of hydrogen stored in the passage may be reduced in all of the above cases. Thus, the pressure in the passage may drop and the pressure in the tank valve-side passage may also drop. When the pressure in the tank valve-side passage drops, the force generated by the difference between the pressure in the fuel tank and the pressure in the tank valve-side passage presses the tank valve. Thus, the plunger and poppet of the tank valve may be pushed to the outside of the fuel tank, i.e. toward the passage, by the force pressing the tank valve. The plunger and the poppet are pressed by the above force, so that the gap between the plunger and the poppet may be removed and the close surface contact between the plunger and the poppet may be realized again.

Meanwhile, when leakage is not resolved even when the pressure is relieved by opening the purge valve, the stack may be driven by supplying additional fuel to the stack at a reference flow rate. When the stack is driven, the hydrogen in the high-pressure line may be more rapidly consumed. In other words, the pressure in the high-pressure line may drop more rapidly. Accordingly, the difference between the pressure in the fuel tank and the pressure in the passage may be larger as compared to the state in which only the purge valve is opened. Therefore, the force that presses the tank valve by the difference between both pressures may also be larger compared to the state in which only the purge valve is opened. If the leakage in the tank valve is not eliminated in spite of the driving of the stack by the supply of fuel thereto at a reference flow rate, the process of eliminating leakage may be repeatedly performed by setting the reference flow rate to a higher value by increasing the amount of hydrogen that is consumed.

In order to prevent fuel leakage from the tank when pressure is relieved by the purge valve, a step of determining whether or not the tank valve is closed (S121) may be performed prior to the method of eliminating leakage. When the tank valve is determined to be opened, the tank valve is then closed. When the tank valve is already closed by the turning off of the ignition, the closing of the tank valve may be maintained. After the closing of the tank valve is checked, the fuel supply valve and the purge valve may be simultaneously opened (S122). Alternatively, the purge valve may be opened after the fuel supply valve is opened.

In the process of opening the purge valve, the variation in pressure in the high-pressure portion may be measured over time. After the variation in pressure in the high-pressure portion is measured for a certain time interval, whether leakage is eliminated may be determined based on the measured value. When the variation in pressure in the high-pressure portion (the portion toward the fuel tank, i.e. near the fuel tank in the passage between the fuel tank and the stack) is larger than a reference pressure variation value, which is preset for a determination of leakage, for a certain time interval, it may be determined that the sealing of the tank valve is maintained and fuel is not leaking. The certain time and the reference value, which are preset for determination of leakage, may be similarly applied as the reference for determining leakage elimination when the stack is being driven.

In order words, when the variation in pressure in the high-pressure portion exceeds a predetermined reference value for a certain time in the state in which only the purge valve is opened, the leakage may be determined to be eliminated from the tank valve due to exhaust pressure by opening the purge valve. When the leakage is determined to be eliminated from the tank valve due to only the exhaust pressure by opening the purge valve, it may be determined that the stack is not being driven. Accordingly, whether or not leakage is eliminated and whether or not the stack is additionally driven may be determined by measuring the variation in pressure in the high-pressure portion for a certain time interval.

In exemplary embodiments, when the pressure in the high-pressure pipe is changed to be 50 bar or more for 5 seconds, it may be determined that leakage is eliminated due to exhaust pressure by the purge valve, and thus the stack may not be driven (S123).

When the leakage is determined to be eliminated from the tank valve due to only the exhaust pressure by opening the purge valve, the opening of the purge valve may be maintained until the pressure in the high-pressure pipe reaches a predetermined pressure value (S124). The opening of the purge valve may be maintained until the pressure in the high-pressure pipe becomes 50 bar. When the pressure in the high-pressure portion reaches the predetermined pressure value, the purge valve may be closed (S125). After the purge valve is closed, the tank valve may be opened in order to return the pressure in the passage between the fuel tank and the stack to a normal state.

On the other hand, when the variation in pressure in the high-pressure portion is smaller than the predetermined reference pressure variation value, it may be determined that fuel leaks from the tank valve. In exemplary embodiments, when the pressure in the high-pressure pipe is not changed to be 50 bar or more for 5 seconds, it may be determined that leakage occurs in the tank valve. When it is determined that leakage is eliminated from the tank valve in spite of the exhaust pressure achieved by opening the purge valve, the stack may be driven by supplying fuel thereto at a reference flow rate. In detail, the stack may be driven in the state in which the fuel supply valve and the purge valve are opened and the tank valve is closed. Since the stack is driven in the state in which the purge valve is opened, the hydrogen in the system except for the tank may be more rapidly consumed. The pressure in the tank valve may be rapidly reduced by the rapid consumption of hydrogen, compared to the state in which only the purge valve is opened. The force that presses the tank valve acts as a result of the reduction in pressure in the tank valve and the high pressure in the fuel tank, i.e. due to the difference between the pressures in both passages on the basis of the tank valve. The force for pressing the tank valve when the stack is driven may be larger than when only the purge valve is opened. Therefore, the force for pushing the plunger and poppet of the tank valve may be larger. Thus, when only the purge valve is opened, leakage may be eliminated. Consequently, the gap between the plunger and poppet of the tank valve is removed and the sealing performance of the valve may be increased. In exemplary embodiments, the method of eliminating leakage may be performed by setting the reference flow rate of fuel supplied to the stack to 500 lpm.

Meanwhile, energy, preferably electric energy may be generated according to the supply of fuel to the stack at a reference flow rate, i.e. by the driving of the stack. The generated electric energy may be stored in an energy storage device. In the embodiment, an HV battery may be used as the energy storage device, and the generated electric energy may charge the HV battery.

Meanwhile, the pressure in the high-pressure portion may be measured while the stack is driven. Whether or not leakage is eliminated and whether or not the driving of the stack is ended may be determined by measuring the variation in pressure in the high-pressure portion for a certain time interval and then by comparing the variation in pressure with a reference value which is preset for determination of leakage. When the variation in pressure is larger than the reference value preset for determination of leakage, it may be determined that the sealing of the tank valve is maintained and leakage does not occur. When the variation in pressure is smaller than the reference value preset for determination of leakage, it may be determined that the pressure is not changed due to continuous leakage from the tank valve.

In exemplary embodiments of the present disclosure, when the pressure in the high-pressure pipe is changed to be 50 bar or more for 5 seconds, it may be determined that leakage is eliminated from the tank valve and that the sealing of the tank valve is maintained. Thus, the driving of the stack may be ended. After driving of the stack is ended, the opening of the purge valve may be maintained until the pressure in the high-pressure pipe reaches a predetermined pressure value. The opening of the purge valve may be maintained until the pressure in the high-pressure pipe becomes 50 bar. When the pressure in the high-pressure portion reaches the predetermined pressure value, the purge valve may be closed. After the purge valve is closed, the tank valve may be opened in order to return the pressure in the passage between the fuel tank and the stack to a normal state.

On the other hand, when the variation in pressure in the high-pressure portion is smaller than the predetermined reference value preset for a determination of leakage, it may be determined that leakage is not eliminated from the tank valve, as described above. Even when the variation in pressure in the high-pressure portion is similar to the predetermined reference value preset for determination of leakage, namely even when it is determined that leakage is not continuously prevented, the driving of the stack may be ended. In exemplary embodiments, when the pressure in the high-pressure pipe is not changed to be 50 bar or more for 5 seconds in spite of the driving of the stack, the driving of the stack may be ended. After the driving of the stack is ended, the existing reference flow rate value for the state in which the stack is being driven may be stored in the controller for controlling the tank valve, preferably in an EEPROM of the controller.

In the step of determining whether or not leakage is eliminated from the tank valve (S130), whether or not leakage occurs may be determined by performing a process similar to the process of detecting leakage in the valve. That is, in the state in which the purge valve is being driven, whether or not leakage is eliminated may be determined by comparing the values obtained by multiplying the volumes and pressure variations in the high and low-pressure portions in the passage between the fuel tank and the stack. When the X value (after the variation in pressure in the low and high-pressure portions in the normal state is measured, the difference between values obtained by multiplying the volumes of the pipes, i.e. the volumes of the passages in the low and high-pressure portions) exceeds a predetermined value, the above process of eliminating leakage is repeatedly performed.

However, the reference flow rate value may be set to be larger than in the previous execution, such that when the process of eliminating leakage is repeatedly performed, a larger amount of hydrogen in the passage between the fuel tank and the stack is consumed and the force for pressing the tank valve is larger. Fuel may be supplied to the stack at a reference flow rate obtained by adding 200 lpm to the previous reference flow rate (S126).

That is, when the process of eliminating leakage is completed a first time and then the process of eliminating leakage is repeated again, the method may further include a step of determining whether or not the stack has previously been driven for a determination of leakage, based on the data stored in the controller (S127), after the step of closing the tank valve (S121). When the stack has not been previously driven, the process of eliminating leakage using only the purge valve without driving the stack may be performed similarly to performing the process of eliminating leakage the first time. However, when the driving history of the stack and the previous reference flow rate are stored in the controller, the process of eliminating leakage may be performed by immediately driving the stack (S126).

Although methods of the present disclosure includes the step of detecting leakage from the fuel tank valve, the step of eliminating the leakage, and the step of determining whether or not the leakage is eliminated, the methods may be performed in the state in which the step of detecting leakage from the fuel tank valve, which is performed whenever the cumulative number of times ignition of the vehicle equipped with the fuel cell system has been executed exceeds the reference number of times, is removed or omitted. The step of eliminating the leakage and the step of determining whether or not the leakage is eliminated may be performed whenever the cumulative number of times ignition has been executed exceeds 100 times.

According to methods of eliminating leakage from a fuel tank valve of the present disclosure as described above, it is possible to perform the process of eliminating leakage in the state in which the fuel cell system is not detached from the vehicle without separate pipes by changing the conventional technique for the rapid consumption of hydrogen, which is performed by connecting the separate pipes, to a method of generating electricity by driving the stack.

That is, in the present disclosure, the hydraulic pressure in the pipe of the fuel cell system can be easily regulated by driving the stack instead of conventionally installing separate pipes. As a result, the leakage can be eliminated from the tank valve, specifically the gap between the plunger and poppet of the tank valve can be removed by the variation in the hydraulic pressure in the pipe, and thus the sealing performance of the valve can be improved.

As is apparent from the above description, it is possible to autonomously and automatically relieve pressure from the high-pressure line of a fuel cell system in a vehicle.

In addition, it is possible to prevent fuel from leaking by reducing the possibility of an occurrence of leakage inside and/or outside the fuel cell system when the fuel cell system is attached to or detached from the vehicle.

Furthermore, since electric energy is generated by driving a stack through the supply of fuel thereto at a flow rate for eliminating leakage, and since the generated energy is stored in an energy storage device, it is possible to increase fuel efficiency compared to the state in which the fuel in the high-pressure line is simply discharged to the outside.

The disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A method of eliminating leakage from a fuel tank valve, comprising:
when the leakage occurs, consuming fuel stored in a passage between a fuel tank and a stack in a state in which a tank valve is closed,
wherein the step of consuming fuel is performed when a cumulative number of ignition times of a vehicle having the fuel tank exceeds a reference number of times, regardless of whether or not the leakage occurs.

2. The method of claim 1, wherein the fuel is consumed by opening a purge valve.

3. The method of claim 1, wherein the fuel is consumed by driving the stack.

4. The method of claim 1, wherein the fuel is consumed by opening a purge valve and driving the stack.

5. The method of claim 1, wherein the step of consuming fuel is performed for a certain time after ignition of the vehicle is turned off.

6. The method of claim 1, further comprising detecting the occurrence of leakage before the step of consuming fuel is performed, wherein:
the passage between the fuel tank and the stack comprises a high-pressure portion having a relatively high pressure therein and a low-pressure portion having a relatively low pressure therein, the high-pressure portion formed adjacent to the tank valve, the low-pressure portion being adjacent to the stack; and
the occurrence of the leakage in the valve is detected based on a difference between values obtained by multiplying passage volumes and pressure variations in the respective high and low-pressure portions.

7. The method of claim 1, further comprising driving the stack by supplying fuel to the stack from the fuel tank at a reference flow rate.

8. The method of claim 7, further comprising storing energy generated by driving the stack in an energy storage device.

9. The method of claim 1, wherein whether or not the leakage in the valve is eliminated is determined by comparing variations in pressure in the fuel tank in the passage between the fuel tank and the stack for a certain time interval with a reference pressure variation value that is preset for determination of leakage.

10. The method of claim 1, further comprising determining whether or not leakage is eliminated,
wherein when the leakage in the valve is not eliminated, a reference flow rate is reset to a larger value than an existing reference flow rate, and the step of consuming fuel is repeatedly performed based on the reset reference flow rate.

11. A method of eliminating leakage from a fuel tank valve which includes a plunger and a poppet, wherein the leakage occurs due to a gap between the plunger and the poppet of the fuel tank valve, the method comprising steps of:
when the leakage occurs, consuming fuel stored in a passage between a fuel tank and a stack in a state in which the fuel tank valve is closed,
determining whether or not leakage is eliminated,
wherein, when the leakage in the valve is not eliminated, a reference flow rate is reset to a larger value than an existing reference flow rate, and the step of consuming fuel is repeatedly performed based on the reset reference flow rate until the gap between the plunger and the poppet is removed.

12. A method of eliminating leakage from a fuel tank valve, comprising steps of:
when the leakage occurs, consuming fuel stored in a passage between a fuel tank and a stack in a state in which the fuel tank valve is closed; and
determining whether or not leakage is eliminated,
wherein when the leakage in the valve is not eliminated, a reference flow rate is reset to a larger value than an existing reference flow rate, and the step of consuming fuel is repeatedly performed based on the reset reference flow rate until the leakage from the tank valve is removed,
wherein the step of consuming fuel is performed when a cumulative number of ignition times of a vehicle having the fuel tank exceeds a reference number of times, regardless of whether or not the leakage occurs.

* * * * *